Feb. 23, 1960  P. E. BIVENS ET AL  2,925,801
APPARATUS FOR APPLYING SURFACE COATINGS TO GLASSWARE
Original Filed Nov. 23, 1956  4 Sheets-Sheet 1

INVENTORS
PAUL E. BIVENS
EARL F. SCHAEFER
BY
W. A. Schaich and
L. D. Soubier
ATTORNEYS

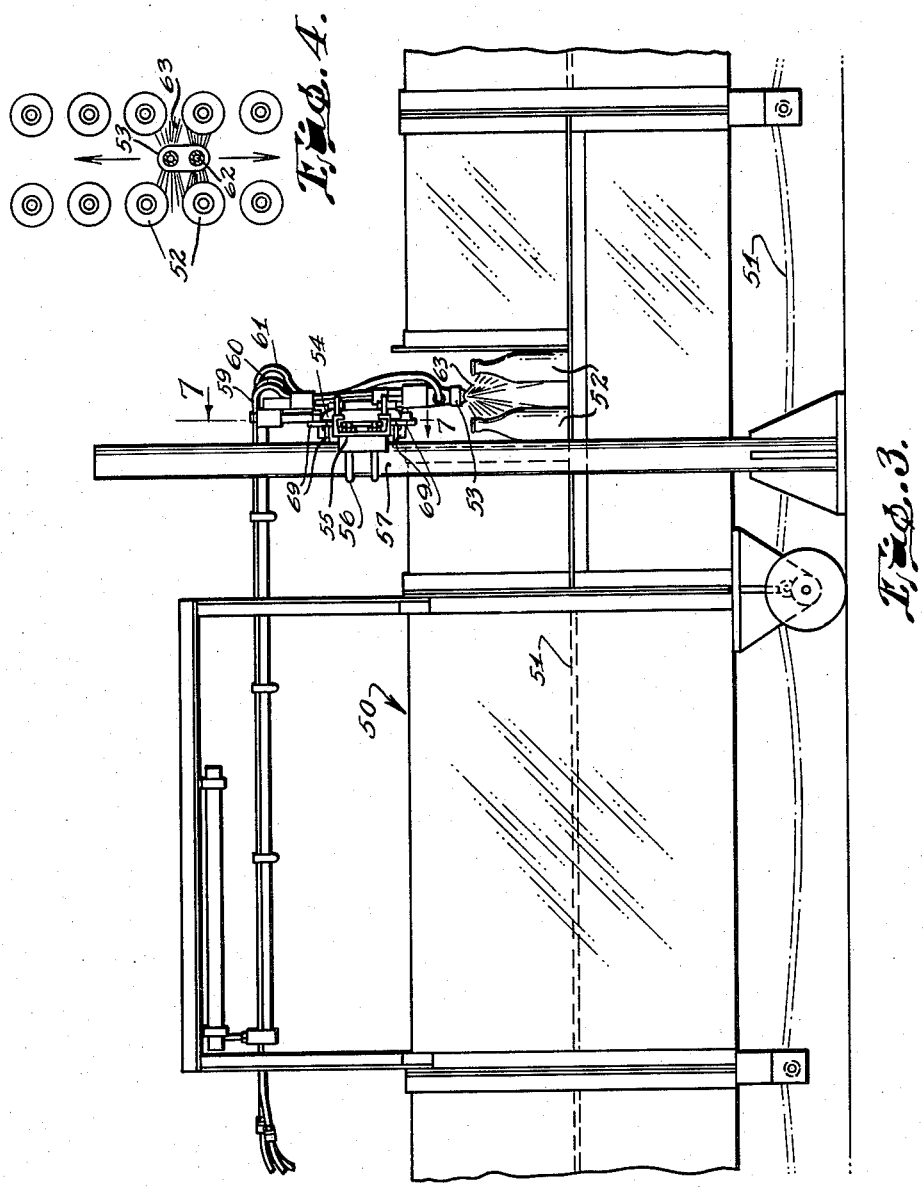

Feb. 23, 1960 P. E. BIVENS ET AL 2,925,801
APPARATUS FOR APPLYING SURFACE COATINGS TO GLASSWARE
Original Filed Nov. 23, 1956 4 Sheets-Sheet 3

Inventors
PAUL E. BIVENS
EARL F. SCHAEFER

By W. A. Schaich and J. D. Soubier
Attorneys

Feb. 23, 1960  P. E. BIVENS ET AL  2,925,801
APPARATUS FOR APPLYING SURFACE COATINGS TO GLASSWARE
Original Filed Nov. 23, 1956  4 Sheets-Sheet 4

INVENTORS
PAUL E. BIVENS
EARL F. SCHAEFER
BY W. A. Schaich and
L. D. Soubier
ATTORNEYS

United States Patent Office 2,925,801
Patented Feb. 23, 1960

2,925,801

APPARATUS FOR APPLYING SURFACE COATINGS TO GLASSWARE

Paul E. Bivens and Earl F. Schaefer, Toledo, Ohio, assignors to Owens-Illinois Glass Company, a corporation of Ohio Continuation of application Serial No. 624,159, November 23, 1956. This application January 21, 1959, Serial No. 788,236

3 Claims. (Cl. 118—2)

This invention relates to glassware-treating apparatus. More particularly, this invention is drawn to an improved apparatus for applying or depositing a uniform coating of a treating liquid onto the surfaces of glassware, and which apparatus is capable of continuous and automatic operation.

It has long been recognized that the surfaces of glass articles are desirably given various treatments in the form of spray applied solutions in order to improve the resistance of the glass article to scratching and/or breaking which would otherwise be encountered in the frequent handling of these glass articles in the various steps involved in their manufacture and use.

Apparatus for applying such solutions of treatments which have been used in the past, however, have generally comprised a gang-type spray system for distributing the treating solution onto the glass surfaces. These gang-type spray systems generally involve a simple linear manifold member, having a plurality of ports extending across their length which continuously emit the treating solution as a veritable curtain of the treating solution.

With the advent of the more recently developed treating materials such as the solutions or emulsions of silicone resins and polyethylene waxes, it has become increasingly evident that the prior art gang-type spray apparatus is economically undesirable in that large amounts of the materials must be utilized in attempting to obtain effective coverage of the entire surfaces of the glassware concerned. More efficient utilization of the comparatively expensive treating solutions could theoretically be effected by the use of spray apparatus which emit the solution in the form of a mist driven by atomizing air. It has been found, however, that the gang-type system cannot be readily modified to emit the solution in mist form because the plurality of ports involved cannot practically be supplied with sufficient pressure to effect the formation of mist, or, even if some mist is formed, the pressures are insufficient to maintain and carry the mist over the entire surfaces of the glassware. As a consequence, it has been found that the mist collects only on the uppermost surfaces of the containers, and the lower side portions are left bare of the treatment, whereupon scratching of the glassware and breakage follow. In addition, the exccess collecting on the top side portion of the bottles interferes with label applications.

Another disadvantage of the apparatus employed heretofore is that such apparatus indiscriminately distributes the treating solution and, as a consequence, the insides of glass containers are coated with the particular agent. Inasmuch as certain treating agents or solutions thereof have toxilogical effects, they cannot be tolerated on the insides of glass containers which are ultimately utilized as containers for foods or beverages for human consumption.

A further disadvantage of apparatus used heretofore is the observed fouling-up and contamination of adjacent equipment. A particular illustration of the foregoing is an annealing oven, which preferably precedes the solution-depositing apparatus, and in which the presence and depositing of treating solutions is obviously detrimental.

While it is true that the mist form of the desirable treating solution can be effected by many commercially-available spray guns utilizing practical operating pressures, it is completely unsatisfactory to attempt to utilize such spray guns by hand. Obviously, hand operation of such equipment involves excessive labor costs and, furthermore, this type of application would be subject to human error such as the depositing of non-uniform films onto the surfaces of the glassware.

Accordingly, it is an object of this invention to provide an apparatus which is capable of depositing a uniform film or layer of treating liquid over the entire surfaces of glassware, which apparatus is capable of continuous unattended operation.

It is a further object of this invention to provide such an apparatus which is easily and readily adjustable to meet a wide variety of commercial requirements.

It is still another object of this invention to provide such apparatus which is particularly adaptable to effect efficient application of relatively expensive treating solutions.

Another object of this invention is to provide apparatus which is capable of applying a surface-treating liquid to only the outer surfaces of glass containers without substantial introduction of the treating agent into the inner confines of the glass container.

Yet another object of this invention is to provide apparatus for applying liquid treatments to glassware, which apparatus may be conveniently utilized in close proximity to conventional glass production and processing equipment without contamination thereof, and which apparatus is additionally characterized by the fact that it is capable of starting and/or terminating a sequence of operation automatically.

The specific nature of this invention, as well as other objects and advantages thereof, will become apparent to those skilled in the art from the following detailed description, taken in conjunction with the annexed sheets of drawings, on which, by way of example only, are illustrated embodiments of this invention.

Referring to the accompanying drawings:

Fig. 3 is a side elevation view of an annealing lehr incorporating an apparatus of this invention.

Fig. 4 is a plan view of adjacent rows of glass containers emerging from the lehr of Fig. 3, as they pass beneath the apparatus of this invention.

Fig. 5 is a side elevation view of the containers in Fig. 4.

Basically, this invention is concerned with continuously operable apparatus capable of effecting a uniform deposit of a treating liquid upon the surfaces of a plurality of singular glassware, and comprising a continuous conveyor for supporting glassware, a spanning support for a spray head, including an arrangement for effecting on-and-off sequence of spray operation, a drive system for effecting reciprocating travel of the spray head along the spanning support responsive to energization provided by an electric eye arrangement positioned adjacent to the conveyor, and an exhaust system for effecting positive unidirectional flow of the spray medium.

Figure 1:
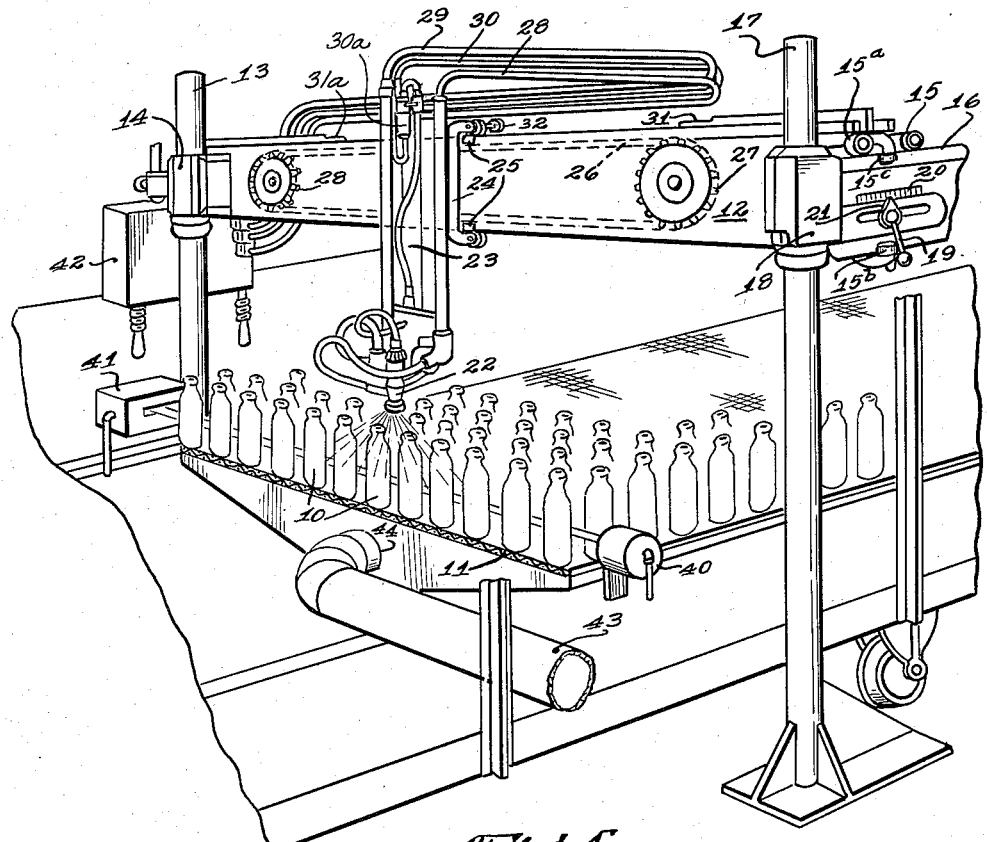
Fig. 1 is a fragmentary perspective view of a specific spraying apparatus of this invention in an operating cycle, illustrating spray being continuously emitted about a plurality of glass containers.

Referring now more specifically to the drawings, there is shown in Fig. 1 a continuous conveyor 11, formed of reticulated material and supporting and advancing a plurality of transversely aligned rows of glass containers 10. Spray head support 12 horizontally spans said container and is slidably and adjustably mounted on a vertical column 13 by clamping member 14. The opposite end of the spray head support is rollably carried by rollers 15, 15a, and 15b on a horizontal I-beam 16, aligned parallel to the conveyor 11, and which is, in turn, slidably mounted on a vertical column 17 by clamping member 18. The angle of the horizontal spray head support, with respect to the path defined by the conveyor 11, can be readily adjusted by loosening locknut arrangement 19, incorporated into member 16. The member 16 also incorporates a scale 20 and a pointer 21 in conjunction with the locknut arrangement 19, permitting ready perception of the angular displacement of the spray head support and, consequently, permits ready adjustment to meet any particular requirement as, for instance, the speed of the conveyor. The clamping members 14 and 18 permit easy adjustment of the height of the spray head support, according to the size of the articles to be treated. A spray head 22 is carried below the spray head support 12 by a vertical member 23 which, in turn, is fixed to a channel member 24, which is rollably carried on the horizontal spray head support 12 by rollers 25. The spray head 22, mounted on the auxiliary members 23 and 24, is movable within the extremities of the horizontal support 12, and its transversing movement is effected by a continuous chain 26, mounted about laterally displaced sprockets 27 and 28, which are mounted at opposite ends of the horizontal support 12, and driven by suitable means not shown. Flexible conduits 28, 29 and 30 are connected to the spray head 22 and supply it with the spray solution, atomizing air, and control air, respectively, the latter operating a needle valve 30a which controls spraying and non-spraying sequence of the spray head. The control air to the needle valve, 30a, and effecting initiation and termination of spray emission, is activated when cam follower 32, attached to the channel member 24, moving across the top surface of the horizontal support 12, contacts respectively the cam projections 31a and 31.

A light source 40 is positioned at one side of the conveyor 11 to direct a beam of light transversely across the conveyor to impinge upon a photoelectric cell 41, positioned on the opposite side of the conveyor. The photoelectric cell initiates a flow of current, as explained more fully hereinafter, and which flow initiates the drive means which effects transverse travel of the spray head 22. The arrangement is so controlled that the spray head 22 has a "home" position at one end of the horizontal support 12. One cycle of operation is defined by the progression of the spray head 22 across the path of the conveyor and its return to the "home" position. The electric eye arrangement initiates a sequence of transverse travel of the spray head 22 when the cell 41 receives an uninterrupted beam of light, but only if such uninterrupted beam of light has been preceded by an interruption of said beam by the passage of a row of containers 10. The signal from the photoelectric cell 41 is transmitted to the electric control box 42, which contains the wiring and control circuits, which are explained more fully hereinafter in connection with Fig. 8. Angular displacement of the horizontal support 12 allows the spray head 22 to advance in the same direction as the glass containers 10, carried on the conveyor 11, at the same uniform rate as the containers, while simultaneously passing transversely over the path of the containers.

Figure 2:
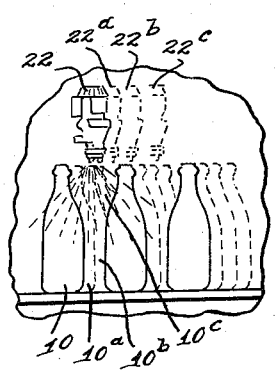
Fig. 2 is a schematic side elevation view of the spray head and the glass containers of Fig. 1, showing the relative position of the spray head with respect to the glass containers.

The results of the foregoing are particularly illustrated in Fig. 2, showing instantaneous position and relationship between the spray head in positions 22, 22a, 22b, and 22c with respect to bottles 10, 10a, 10b, and 10c. When a spraying sequence has been initiated by the action of the photo cell 41, the spray head 22 proceeds across the conveyor 11 between two adjacent rows of containers. As the spray head 22 reaches the end of its path between two adjacent rows, the spray is terminated by the cam means 32 and 31, activating the air supply 30 and, in turn, closing a needle valve within the spray head 22, while the chain 26, acting on auxiliary support members 24 and 25 returns the spray head 22 to the "home" position in time to repeat the cycle, if energized by the photoelectric cell. The conveyor 11 may, of course, be driven at a uniform rate of speed, or it may be advanced in intermittent sequences of stop and go. With this arrangement, the horizontal spray head support 12 can be aligned parallel to the rows of containers and the spray head caused to pass between said adjacent rows while they are in a momentary stationary position. Obviously, in this latter type of operation, spray can be continuously maintained as the spray head 22 passes in spraying sequence over and back, followed by an advancement of the rows by the conveyor to bring the next two adjacent rows into position, followed by another traversing sequence of operation, etc.

An exhaust vent 43 is positioned beneath the conveyor 11 in such a position that the major exhaust zone 44 is in a plane passing vertically through the spray head 22. An exhaust fan (not shown) in the exhaust vent 43 is operated continuously and serves to provide a uniform and unidirectional flow of the sprayed solution issuing from the spray head 22. This serves to insure complete contact of the entire outer glass container surfaces, and also serves to prevent any treating solution from being swept by indiscriminate air currents backward into the adjacent equipment.

In another embodiment of this invention, there is illustrated in Fig. 3 an annealing oven, or lehr, 50, through which proceeds a continuous conveyor 51, formed from a reticulated material, supporting and advancing transversely aligned rows of glass containers 52. The glass containers 52 pass beneath the path of a spray head 53 as they emerge from the annealing lehr. The spray head 53 is mounted to rigidly suspend from an intermediate support member 54, which, in turn, is rollably carried by rollers 69 on the guide rails 70 and 70a (Fig. 7) at the top and bottom of a horizontal channel member 55. The channel 55 is held by clamps 56 and 56a to vertical columns 57 and 58 (Fig. 6), disposed on opposite sides of the conveyor. Conduits 59, 60 and 61 are connected to the spray head 53 and supply it with treating solution, atomizing air, and control air, respectively, the latter operating a needle valve as described in connection with Fig. 1. The travel of the spray head 53 is controlled so as to traverse the advancing rows of glass containers only when the spray head is positioned intermediately between two adjacent rows of glass containers. This position is particularly illustrated in the plan view constituting Fig. 4. Furthermore, most preferably, the spray head is positioned, as illustrated in Fig. 5, so that the lowermost spray-emitting orifice 62 of the spray head just clears the tops of the containers 52. Furthermore, the spray emission is preferably controlled so as to emit a cone-shaped zone 63. The latter, in conjunction with the close clearance between the mist-emitting orifice 62 and the tops of the containers, together with the termination of the spray by a camming arrangement, as described hereinbefore, in connection with Fig. 1, prevents any solution from entering containers on the return passage of the spray head.

Drive means 64 (Fig. 6) is mounted on the horizontal support channel 55 and operates through a speed reducer 65 to drive sprocket member 66 (see also Fig. 7), mounted at one end of horizontal member 55. The sprocket 66 drives a continuous chain 67, which engages sprocket 68, mounted at the opposite end of the member 55. The chain drives the spray head support member 54 and the spray head 53, effecting transverse movement of the spray head to and fro over the advancing rows of glass containers. The chain effects movement of the spray head by means of a lug link 71 (Fig. 7), projecting from the outer periphery of the continuous chain. The lug projects upward when the lug link is on the upper path of travel of the chain between the two sprockets, and projects downward when on the bottom path of travel of the chain between the two sprockets. The support member 54 from which the spray head is rigidly suspended bears two fingers or projections 72 and 73, so arranged as to be engaged by the lug, one projection 72 being engaged when the lug projects up, and the other 73 when the lug projects down. In this fashion, reciprocal travel of the spray head is accomplished with a single drive source as the lug proceeds in the path of travel of the chain and particularly, the outer periphery thereof.

In typical operation, the glass containers after forming are passed through the annealing oven 50 on the conveyor 51, where they are gradually cooled from their forming temperature to a temperature range most adaptable to the particular treatment to be applied. As the glass containers pass along the interior of the lehr 50, they pass into the arrangement of this invention and, as the beam of light is broken by one row of containers, followed by an uninterrupted beam of light reaching the photoelectric cell (light source and cell not being shown in Figs. 3 and 6), an operating cycle of the spray head 53 is initiated, whereupon the spray head, in spraying sequence, proceeds equidistantly between adjacent rows of containers. As stated previously, as the spray head reaches the end of its path in that direction, the spray is terminated and the spray head 53, carried by the drive chain, returns to its original position. As can be readily understood, even though the spray head in its return path passes over the open mouths of the containers, inasmuch as the spray has been terminated, none will enter the containers. The travel of the spray head carried on the channel member 55 is terminated at its original or "home" position by the contact of the lug 71 with a switch 74 (Fig. 7), mounted on the channel support 55, to the lower left of the sprocket 66. The contact opens the switch 74 momentarily as discussed hereinafter, and de-energizes the drive motor, causing the spray head to coast to a stop at the "home" position, where it remains until another sequence of operation is initiated.

Figure 8:
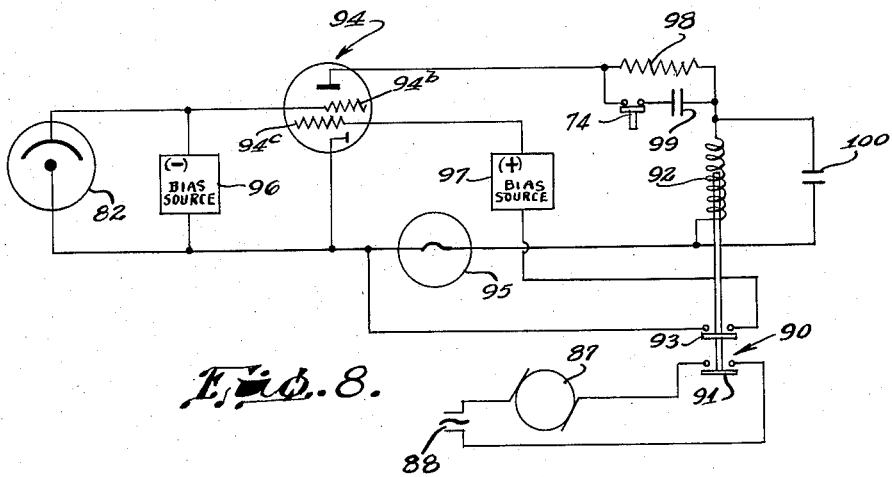
Fig. 8 is a schematic representation of the electric circuit diagram controlling the mechanical operation of the apparatus of this invention.

Referring to Fig. 8, which is a schematic representation of a suitable control circuit for controlling the energization of the drive motor 87, it will be noted that the drive motor is energized from a suitable power source 88 through closing the normally open contacts 91 of a relay 90. The energizing coil 92 of relay 90 is connected in the plate circuit of a thyratron type tube 94, and power for such plate circuit supplied by a suitable alternating current source 95. A resistance 98 is connected in series with coil 92, and is shunted by condenser 99 and the normally closed contacts of limit switch 74. In normal operation, a negative bias is imposed on the shield grid 94b of thyratron 94 by a negative bias source 96, and the photocell 82 is connected with the negative bias circuit 96 in such manner that light energization of the photocell 82 will reduce the negative bias on shield grid 94b, and cause thyratron tube 94 to fire. This energization of thyratron tube 94 causes the energization of relay 90, with the closing of contacts 91 and energization of drive motor 87. The uncharged condenser 99 effectively shorts out resistance 98 during such energization, but when condenser 99 is fully charged, the current through coil 92 is sufficient to hold the relay closed. Additionally, a positive bias circuit 97 is provided, which is connected to a control gird 94c of thyratron tube 94 through a pair of normally open contacts 93 of relay 90. Hence, the energization of relay 90 also results in the application of a positive bias to control grid 94c. This bias is sufficient to overcome the effect of the negative bias normally imparted by the negative bias circuit 96, hence, thyratron tube 94 remains in a firing condition even though light energization of the photocell 82 is interrupted. Hence, the light reducing effects of the spray mist may de-energize photocell 82, but will not interrupt the energization of drive motor 87. This insures that the drive motor 87 for the spray head will remain energized until the spray head completes a full traverse across the conveyor.

De-energization of drive motor 87 is effected by the opening of the limit switch 74, which is momentarily opened when the spray head completes its traverse. The opening of limit switch 74 de-energizes relay 92 and, hence, disconnects the positive bias circuit 97 from control grid 94c, and concurrently opens contacts 91 to de-energize the drive motor 87. This action is produced by the temporary elimination of condenser 99 from the energizing circuit for relay 92, which results in the condenser 100 discharging through the coil of relay 92 to de-energize the relay. When the contacts of limit switch 74 reclose, the condenser 99 is connected back into the circuit in tis fully charged condition, and this prevents sufficient current flow through the coil of relay 92 to cause it to pick up. Accordingly, even though thyratron tube 94 remains in a conducting condition due to light impinging on photocell 82, relay 92 will remain de-energized and, hence, drive motor 87 will not be energized. When light impinging on the photocell 82 is interrupted, such as by the passage of the next row of bottles through the beam, the photocell 94 is rendered non-conductive, and the charge on condenser 99 is dissipated through resistance 98. Thus, the thyratron tube 94 is restored to its initial condition wherein it is prevented from firing by the negative bias circuit 96, and tube 94 remains in such condition until the photocell 82 is again light energized.

Figure 6:
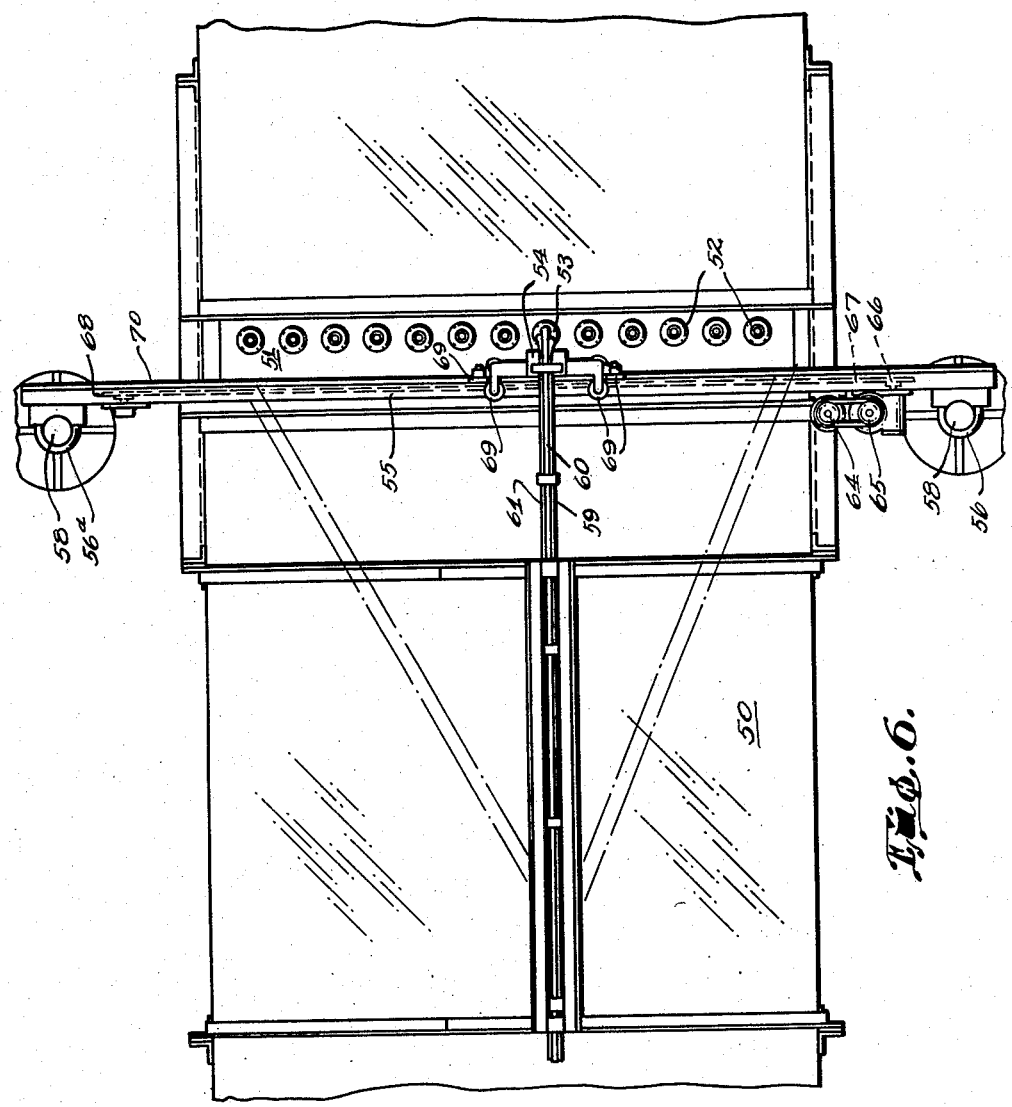
Fig. 6 is a plan view of the annealing lehr of Fig. 3.
Figure 7:
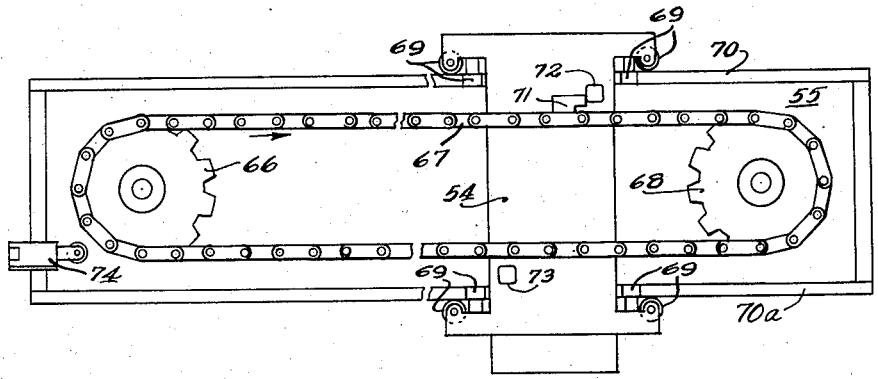
Fig. 7 is a schematic section view taken on the line 7—7 of Fig. 3.

The apparatus of this invention has been found to possess extreme utility in applying the more recently developed surface-treating agents, such as the aqueous solutions or emulsions of silicone resins or polyethylene waxes. It has been found generally desirable to bring the surface temperature of the glassware to a temperature of from about 100° F. to about 400° F. just prior to exposing them to the apparatus of this invention. Examination of glass containers bearing a coating of a silicone resin deposited by the apparatus of this invention reveals that the entire surface thereof, both the top, or shoulder portion, and the bottom portion, exhibits uniform water repellancy, thus demonstrating that a uniform deposit of the silicone resin has been satisfactorily accomplished with the apparatus of this invention. It has further been found that the aqueous solutions of silicone resin or polyethylene waxes are able to be deposited on glass containers, utilizing the apparatus of this invention, at a substantial savings in cost of treatment per unit bottle as compared to that possible with apparatus known heretofore. It has further been found that utilization of the apparatus of this invention in an annealing oven lehr, as illustrated in Figs. 3 and 6, for extended periods of time are possible without any material contamination of the annealing lehr by the resinous material contained in the aqueous solution. This has been made possible by the cooperative inter-action effected between the relatively small singular and confined zone of the mist of aqueous solution, the discontinuous operation thereof, and the exhaust duct positioned immediately below the spray-emitting source, whereby a positive unidirectional flow of the mist of emulsion has been successfully maintained. This elimination of contamination of the adjacent annealing lehr effects considerable savings in "down time," which would otherwise be necessary in order to return the annealing lehr to its uncontaminated condition.

The present application is a continuation application of our application Serial No. 624,159, filed November 23, 1956, entitled, "Apparatus For Applying Surface Coatings To Glassware."

While the invention has been described with particular reference to certain preferred embodiments thereof, it is possible to make variations and modifications therein without departing from the spirit and scope of the invention, as defined in the appended claims.

We claim:

1. Apparatus for applying a surface treatment to only the outer surface of open-mouth glass containers, which comprises a continuously advancing conveyor for supporting and advancing glass containers in transversely aligned rows, a spray head support horizontally spanning said conveyor and having a cam at each end thereof, means for angularly shifting said support relative to said conveyor in a horizontal plane, spray means movably carried on said support and including a cam follower operatively attached thereto for contacting each cam, said spray means being adapted to emit a downwardly projected, generally confined mist of a treating liquid, valve means responsive to contact of said cam follower with each of said cams to regulate flow of liquid to said spray means in sequential fashion as governed by said cam elements, drive means for conveying said spray means from a starting position at one end of said support to a second position at the other end of said support and thence back to said starting position, a light-energized photoelectric cell mounted adjacent to said conveyor, means for directing a light beam across said conveyor to impinge on said photoelectric cell, and means responsive to light-energization of said photoelectric cell to activate said drive means, but only when said cell receives an uninterrupted beam of light preceded by an interruption of said beam.

2. Apparatus for applying a surface treatment to only the outer surface of open-mouth glass containers, which comprises a continuously advancing conveyor for supporting and advancing glass containers in transversely aligned rows, a spray head support horizontally spanning said conveyor and having a cam at each end thereof, spray means movably carried on said support and including a cam follower operatively attached thereto for contacting each cam, said spray means being adapted to emit a downwardly projected, generally confined mist of a treating liquid, valve means responsive to contact of said cam follower with each of said cams to regulate flow of liquid to said spray means in sequential fashion as governed by said cam elements, drive means for conveying said spray means from a starting position at one end of said support to a second position at the other end of said support and thence back to said starting position, a light-energized photoelectric cell mounted adjacent to said conveyor, means for directing a light beam across said conveyor to impinge on said photoelectric cell, and means responsive to light-energization of said photoelectric cell to activate said drive means, but only when said cell receives an uninterrupted beam of light preceded by an interruption of said beam.

3. Apparatus for applying a surface treatment to only the outer surface of open-mouth glass containers, which comprises a continuously advancing conveyor for supporting and advancing glass containers in transversely aligned rows, a spray head support horizontally spanning said conveyor and having a cam at each end thereof, means for positioning said support in angular relationship to the path of advancement of said conveyor, viewed in plan, spray means movably carried on said support and including a cam follower operatively attached thereto for contacting each cam, said spray means being adapted to emit a downwardly projected, generally confined mist of a treating liquid, valve means responsive to contact of said cam follower with each of said cams to regulate flow of liquid to said spray means in sequential fashion as governed by said cam elements, drive means for conveying said spray means from a starting position at one end of said support to a second position at the other end of said support and thence back to said starting position, a light-energized photoelectric cell mounted adjacent to said conveyor, means for directing a light beam across said conveyor to impinge on said photoelectric cell, and means responsive to light-energization of said photoelectric cell to activate said drive means, but only when said cell receives an uninterrupted beam of light preceded by an interruption of said beam.

References Cited in the file of this patent

UNITED STATES PATENTS

| | | |
|---|---|---|
| 1,929,896 | Merritt et al. | Oct. 10, 1933 |
| 2,246,502 | Bramsen et al. | June 24, 1941 |
| 2,281,169 | Pattison | Apr. 28, 1942 |
| 2,369,737 | Jackson et al. | Feb. 20, 1945 |